Dec. 4, 1956  E. J. MARTIN  2,773,004
SOLVENT RECOVERY OF RESINS FROM PRECIPITATED ASPHALT
Filed March 18, 1952
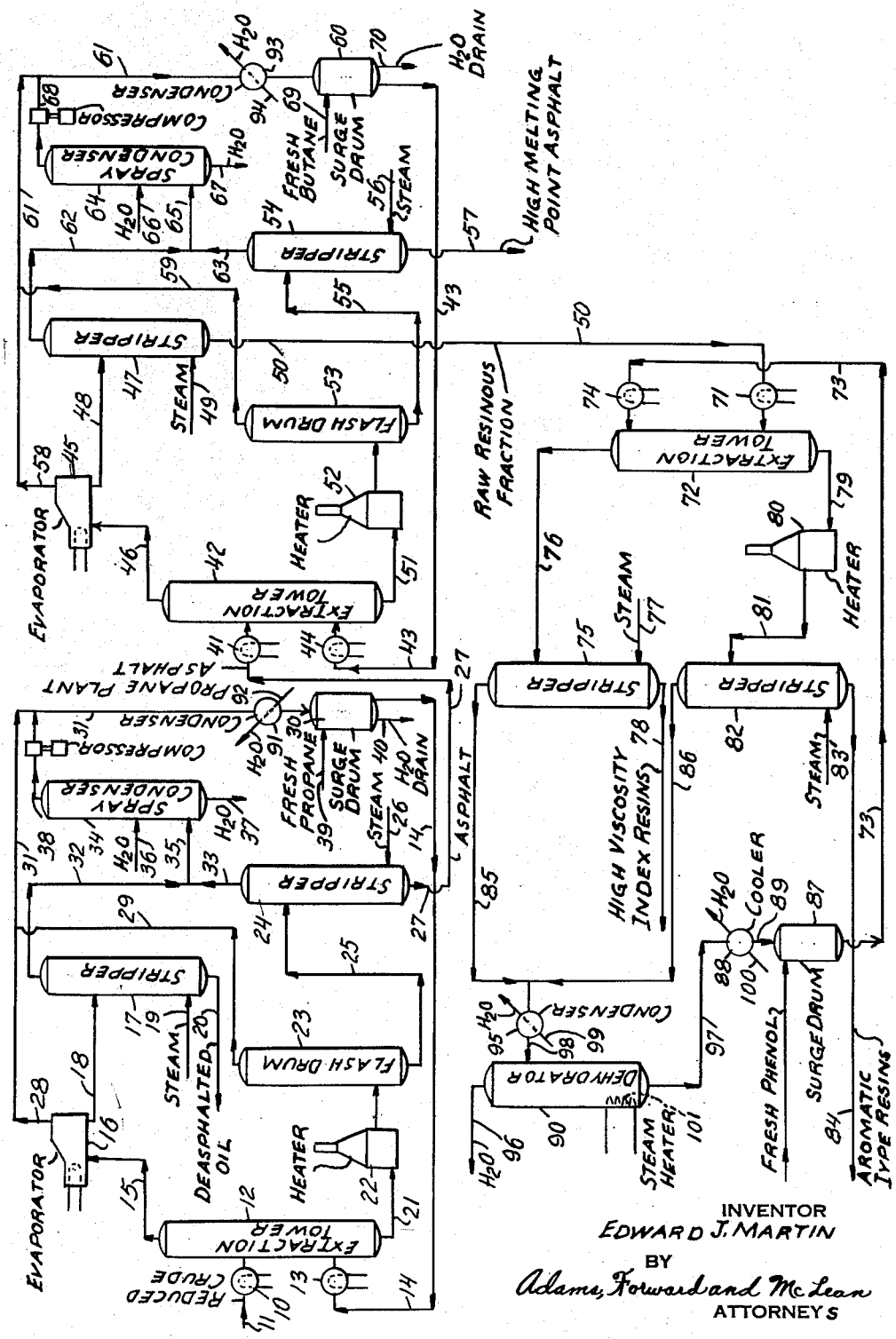
INVENTOR
EDWARD J. MARTIN
BY
Adams, Forward and McLean
ATTORNEYS

United States Patent Office 2,773,004
Patented Dec. 4, 1956

2,773,004

SOLVENT RECOVERY OF RESINS FROM PRECIPITATED ASPHALT

Edward J. Martin, Homewood, Ill., assignor to Sinclair Refining Company, New York, N. Y., a corporation of Maine Application March 18, 1952, Serial No. 277,203

2 Claims. (Cl. 196—14.15)

My invention relates to the recovery of specialized resinous compositions from heavy residual by-products of conventional petroleum refinery deasphalting operation. More particularly it provides a method for recovering valuable high viscosity index resins and aromatic type resins from high viscosity raw resinous petroleum fractions.

In refining residual stocks derived from asphaltic or mixed base crudes, particularly in lubricating oil production, it is conventional to treat or deasphalt the residual stock by contacting it with a precipitant such as liquid propane in order to precipitate asphalt, asphaltenes, and relatively high molecular weight materials. The deasphalted oil is a relatively clean stock of enhanced paraffinicity. By controlling the temperature and other contact conditions or by a staged propane addition operation, it is possible to separate a high melting asphalt and one or more petroleum resin fractions. The deasphalted oil may be subjected to the usual solvent extraction refining methods to produce high viscosity index lubricating oil stocks. In this operation deasphalted oil is contacted with a selective solvent such as phenol or nitrobenzene which extracts the more aromatic components from the oil and produces a raffinate of substantially enhanced paraffinicity. The extract oil is a viscous oil or raw resin fraction of low viscosity index. Although proposals for utilizing the extract oil have been made it has found little commercial use and ordinarily is disposed of as refinery fuel or as a blend in thermal cracking stocks. The resinous fraction recovered by propane precipitation perhaps has greater utility but is also of relatively low viscosity index and has amorphous physical properties. I have now devised a sequential process which includes deasphalting a residual petroleum stock, deresining the resulting asphalt and fractionating the separated raw resin to produce resins of improved utility having sharply defined physical characteristics. The high viscosity index resins produced by my sequential process have a viscosity index 50 to 100 percent higher than conventionally produced raw resinous fractions and are particularly useful as blending agents to improve viscosity and other properties in high-grade lubricating oils. The aromatic type resins also produced by my sequential process are of unusual aromaticity and tackiness and may be used with advantage as paper laminates, in adhesive compositions, or in protective coatings.

According to my invention, an asphalt obtained by contacting a residual petroleum stock with a liquid precipitant is contacted with a butane solvent at an elevated temperature below the critical temperature of the solvent under superatmospheric pressure sufficient to maintain the solvent in liquid phase and a raw resinous fraction is separated from a high melting point asphalt fraction and stripped free of solvent. The raw resinous fraction is subjected to extraction at an elevated temperature with a selective solvent having high selectivity for aromatic components and the two resulting liquid phases are separated. Both phases are stripped free of solvent to yield a high viscosity index resin from the raffinate phase and an aromatic type resin from the extract phase. Advantageously the butane solvent to asphalt feed ratio exceeds about 5 to 1, is preferably about 10 to 1, and the selective solvent for aromatics to resinous fraction ratio is about 0.5 to 5:1, preferably about 1 to 1. Also advantageously the selective solvent for aromatics contains about 0 to 15 percent water and the raw resin is fractionated at about 160° to 260° F., preferably at about 200° F. With particular advantage the selective solvent for aromatics is phenol. All three extraction steps may be accomplished either in a continuous countercurrent process or in a batch process.

In general my method of deresining asphalt requires contacting an asphalt, such as propane plant asphalt having a specific gravity at 77° F./77° F. of 1.0345, a ring and ball softening point of 133° F., a penetration at 77° F. of 17, and a carbon residue of 27 weight percent, with a butane solvent in liquid phase at a high enough temperature to insure adequate separation, followed by the steps of separating a solvent plus raw resin fraction and a solvent plus spent asphalt fraction and stripping both fractions free of solvent. The yield of raw resin obtained appears to depend so far as I am able to determine primarily upon the temperature, the solvent to feed ratio and the degree of contact obtained in the contacting or extraction step.

The upper temperature, of course, is limited by the critical temperature of the solvent; i. e., 306° F. for n-butane and 272° F. for isobutane. The temperature on the low side is limited by the desirability of producing a raw resinous fraction of relatively good color which is relatively free of asphaltic constituents. By varying treating temperature and solvent ratio, the yield and viscosity of the raw resin can be varied over a wide range. For any given viscosity I have found the quality or degree of separation of resin and asphalt can be readily determined by measuring the carbon residue of the raw resin fraction by the Conradson method. Carbon residue places a limitation on the ultimate resin product in the sense that it may be desired to use it as a blending agent in top grade lubricating oils, but a fairly high carbon residue; e. g. upwards of 5%, is associated with the higher viscosity characterizing the useful product. The carbon residue may be decreased by increasing the top extraction temperature but this of course decreases yield.

I have found that a top extraction temperature of about 250° F., corresponding to a pressure of about 500 p. s. i. g., is a useful operating temperature for normal butane for yields of about 60% (corresponding to about 11% carbon residue). As resins are less soluble in isobutane than in normal butane, I recommend the production of a lower carbon residue raw resinous fraction, say about 5 Con carbon, at about 22 volume percent yield when employing isobutane as the extraction solvent. With isobutane a top extraction temperature of 250° F. corresponding to a minimum pressure of 405 p. s. i. g. represents a useful operating temperature. I have found that it is particularly desirable to use butane solvent to oil ratios of about 10 to 1 or somewhat higher. At lower solvent ratios, yield and product quality are sacrificed although the relationship between temperature and solvent ratio permits considerable latitude, as by reducing operating temperature to compensate for lower solvent ratio.

Although I have treated asphalts with various solvents, I have found that the butanes possess peculiar capacities for producing raw resinous fractions of high viscosity and aromaticity in good yields having a reasonable color. I found, for example, that propane was not a suitable solvent because very high propane to asphalt ratios were required, e. g., about 40 to 1 at about 80° F., to obtain a yield of about 27%. By contrast, with pentane and above, separation does not occur at all, or is inadequate in the sense that the resinous fractions produced contain excessive quantities of asphalt material. However, with normal butane I am able to produce about 60% of a raw resinous fraction of about 10° API gravity, about 3,000 SSU viscosity at 210° F. viscosity and about 5,000 to 7,000 optical density color. With isobutane I am able to produce upwards of 20% of a raw resinous fraction of about 12° API gravity, 1,000 SSU at 210° F. viscosity and about 1,500 to 2,500 optical density color.

My method of fractionating the separated raw resinous fraction requires intimately contacting the raw resinous fraction with, for example, phenol at an elevated temperature followed by the steps of separating a solvent plus high viscosity index resin fraction and a solvent plus aromatic type resin fraction and stripping both fractions free of solvent. I have found that unexpectedly, the raw resinous fraction, when contacted, for example, with a phenol-water solvent containing about 8% water at a temperature of about 200° F. at a total solvent to raw resin ratio of about 1 to 1, forms two phases of widely differing viscosity which permits very sharp separation of the high viscosity index resins and the aromatic type resins. The high viscosity index resins may be further improved by additional phenol fractionation under similar conditions.

Although I prefer phenol as the selective solvent for aromatics, other solvents are suitable such as furfural, nitrobenzene, various amines, cresylic acid, sulfur dioxide, etc.

Various raw resinous fractions produced by butane extraction of propane plant asphalt were each twice intimately contacted with a phenol-water solvent containing 8.1 to 9.1% water at a total solvent to raw resin ratio of 1 to 1.16:1 at a temperature of 200° F., allowed to settle for four hours, and the resulting phases were separated and stripped of solvent. Test inspections on the raw resinous fractions, the high viscosity index resins and the aromatic type resin extracts were as follows:

|  | Raw Resin | High VI Resin | Extract #1 | Extract #2 |
| --- | --- | --- | --- | --- |
| Yield, Vol. Percent | | 70–80.3 | 30–19.7 | 30–19.7 |
| Gravity, °API | 9.6–10.2 | 12.4–12.8 | 1.0–2.8 | 2.2–3.2 |
| Viscosity, SSU/210° F | 2,805–3,130 | 2,170–2,415 | 11,000–15,700 | 8,900–11,000 |
| O. D. Color | 5,445–8,850 | 5,530–7,050 | 7,800–12,000 | 8,900–15,000 |
| Carbon Residue, Wt. Percent | 11.9–12.5 | 9.0 (Avg.) | 16.8 | 16.6 |
| Viscosity Index | 37–50 | 76–87 | | −231 |

These data indicate that phenol fractionation results in a 600 to 800 Saybolt seconds viscosity decrease, a viscosity index increase of about 55 to 100% and a carbon residue decrease in the high viscosity index resins over the raw resinous fractions.

In similar manner high viscosity index resins and aromatic type resins may be produced by a sequential process which includes deasphalting a residual petroleum stock under such conditions as required to produce a relatively heavier deasphalted oil containing high viscosity resins, deresining the heavy deasphalted oil and fractionating the separated raw resin. The deresining of the heavy deasphalted oil may be accomplished by varying the temperature and other contact conditions after the deasphalting step or by a staged propane addition operation. For example, a propane deasphalted heavy oil having a gravity of about 13° API and a viscosity at 210° F. of about 287 SSU may be contacted with additional propane at a propane to oil ratio of about 8 to 10:1 at a top extraction temperature of the order of about 200° F. and a pressure of about 600 p. s. i. g. A deresined oil-solvent extract and a raw resin-solvent raffinate are separated and stripped free of solvent. The raw resinous fraction recovered from the raffinate has a gravity of about 6° API and a viscosity at 210° F. of about 2,000 SSU. The raw resinous fraction may then be phenol fractionated as described above into high viscosity index resins and aromatic type resins.

Alternately, the heavy deasphalted oil can be phenol treated prior to the second propane fractionation. Then the oil and high viscosity index resins are separated by propane extraction. The advantage of this sequence is that the phenol extraction is more easily accomplished due to the lower viscosity of the charge oil. However, the low viscosity index resins are not recovered by this sequence.

My invention will now be described with reference to the accompanying drawing which represents a flow diagram of the processes and equipment involved.

A residual stock derived from an asphaltic or mixed base crude is heated in heater 10 in line 11 and introduced into extraction tower 12 where it is contacted with liquid propane from line 14 and heater 13. A deasphalted oil-propane stream is passed overhead from extraction tower 12 to evaporator 16 by means of line 15. The oil is then passed to stripper 17 by means of line 18 where it is steam stripped with steam entering through line 19. The deasphalted oil is removed from stripper 17 by means of line 20. Asphalt containing propane leaves tower 12 by means of line 21 and is passed to heater 22 and to flash drum 23. The asphalt is then passed to stripper 24 by means of line 25 where it is steam stripped with steam entering line 26. The stripped asphalt leaves stripper 24 through line 27. Propane leaving evaporator 16 and flash drum 23 through lines 28 and 29 respectively is passed through line 31 and condenser 91 to surge drum 30. Water passes through condenser 91 by means of line 92. Propane leaving strippers 17 and 24 by means of lines 32 and 33 respectively is passed to spray condenser 34 by means of line 35. Water enters spray condenser 34 by line 36 and is withdrawn through line 37. Propane leaving spray condenser 34 through line 38 is compressed and passed to surge drum 30 through line 31 and condenser 91. Fresh propane is introduced into surge drum 30 through line 39. Water is drained from surge drum 30 by line 40. Propane is recycled to extraction tower 12 from surge drum 30 through line 14.

The propane plant asphalt leaving stripper 24 by means of line 27 passes through heater 41 to extraction tower 42 where it is contacted with liquid butane from line 43 and heater 44. A resin-butane stream is passed overhead from extraction tower 42 to evaporator 45 by means of line 46. The raw resin is then passed to stripper 47 by means of line 48 where it is steam stripper with steam entering through line 49. The raw resin is removed from stripper 47 by means of line 50. Heavy asphalt containing butane leaves tower 42 by means of line 51 and is passed to heater 52 and to flash drum 53. The asphalt is then passed to stripper 54 by means of line 55 where it is steam stripped with steam entering line 56. The stripped asphalt leaves stripper 54 through line 57. Butane leaving evaporator 45 and flash drum 53 by means of lines 58 and 59 respectively is passed through line 61 and condenser 93 to surge drum 60. Water passes through condenser 93 by means of line 94. Butane leaving strippers 47 and 54 by means of lines 62 and 63 respectively is passed to spray condenser 64 by means of line 65. Water enters spray condenser 64 by means of line 66 and is withdrawn through line 67. Butane leaving spray condenser 64 through line 68 is compressed and passed to surge drum 60 through line 61 and condenser 93. Fresh butane is introduced into surge drum 60 through line 69. Water is drained from surge drum 60 by line 70. Butane is recycled to extraction tower 42 from surge drum 60 through line 43.

The raw resinous fraction from stripper 47 is passed through line 50 and heater 71 to extraction tower 72, where it is contacted with liquid phenol from line 73 and heater 74. A raffinate containing high viscosity index resins is passed from extraction tower 72 to stripper 75 by means of line 76 where is it steam stripped with steam entering through line 77. The high viscosity index resins are removed from stripper 75 by means of line 78. An aromatic type resin extract is removed from tower 72 by means of line 79 and passed through heater 80 and line 81 to stripper 82 where it is steam stripped with steam entering through line 83. The aromatic type resins are removed from stripper 82 by means of line 84. Phenol leaving strippers 75 and 82 by means of lines 85 and 86 respectively is passed through condenser 95 and line 98 to dehydrator 90 equipped with steam heater 101. Water passes through condenser 95 by means of line 99. Part or all of the water is stripped from the phenol and removed overhead from dehydrator 90 through line 96. Dry phenol or phenol containing the desired percentage of water is removed from the bottom of dehydrator 90 and is passed through cooler 88 to surge drum 87 by means of lines 89 and 97. Water passes through cooler 88 by means of line 100.

I claim:

1. A process for recovering substantially oil-free high viscosity index resins and substantially oil-free aromatic type resins in petroleum which comprises contacting a residual stock with a liquid, normally gaseous paraffin precipitant to precipitate an asphalt fraction which contains a raw resinous fraction, contacting the asphalt fraction with a butane solvent at a butane to asphalt ratio exceeding about 5 to 1 at an elevated temperature below the critical temperature of the solvent and under superatmospheric pressure sufficient to maintain the solvent in liquid phase, separating the raw resinous fraction as extract, stripping the solvent from the raw resinous fraction, subjecting the raw resinous fraction to extraction at a temperature of about 160° to 260° F. with a selective solvent having a high selectivity for aromatic components at a total solvent to raw resin ratio of about 0.5 to 5:1, and recovering a high viscosity index resinous fraction from the raffinate and an aromatic resinous fraction from the extract.

2. The process of claim 1 in which the selective solvent having a selectivity for aromatic components is a phenol solvent containing about 0 to 15% water.

References Cited in the file of this patent

UNITED STATES PATENTS

| | | |
|---|---|---|
| 2,029,288 | Bray | Feb. 4, 1936 |
| 2,081,496 | Merrill | May 25, 1937 |
| 2,114,796 | Crawley | Apr. 19, 1938 |
| 2,115,846 | Frolich | May 3, 1938 |
| 2,131,205 | Wells et al. | Sept. 27, 1938 |
| 2,295,035 | Gilbert et al. | Sept. 8, 1942 |
| 2,307,873 | Betts | Jan. 12, 1943 |
| 2,392,497 | O'Neill | Jan. 8, 1946 |
| 2,451,433 | Davis | Oct. 12, 1948 |
| 2,500,757 | Kiersted | Mar. 14, 1950 |